(12) United States Patent
Lee et al.

(10) Patent No.: US 7,204,877 B2
(45) Date of Patent: Apr. 17, 2007

(54) ANTI-REFLECTIVE COATING COMPOSITION AND COATING FILM WITH EXCELLENT STAIN RESISTANCE

(75) Inventors: Young-Eun Lee, Daejeon (KR); Mi-Young Han, Daejeon (KR); Yeong-Rae Chang, Daejeon (KR); Jeong-Jin Hong, Daejeon (KR); Sung-Hoon Jang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 210 days.

(21) Appl. No.: 11/104,659

(22) Filed: Apr. 13, 2005

(65) Prior Publication Data

US 2005/0239933 A1    Oct. 27, 2005

(30) Foreign Application Priority Data

Apr. 14, 2004  (KR) ............... 10-2004-0025704

(51) Int. Cl.
*C09D 5/32* (2006.01)
*C09D 5/24* (2006.01)

(52) U.S. Cl. .................. 106/287.16; 106/287.13; 524/356; 524/366; 524/379; 525/477; 525/535; 528/14; 528/42

(58) Field of Classification Search .............. None
See application file for complete search history.

(56) References Cited

U.S. PATENT DOCUMENTS 5,534,748 A * 7/1996 Oomen ................ 313/479
5,750,054 A * 5/1998 Cinquina et al. ........... 252/500
6,391,227 B1 * 5/2002 Yoon et al. ................ 252/500
6,404,120 B1   6/2002 Aben et al.
2001/0031811 A1  10/2001 Li et al.

FOREIGN PATENT DOCUMENTS

| EP | 0 776 925 B1 |   | 2/2004 |
|----|----|----|----|
| JP | 06-065529 |   | 3/1994 |
| JP | 08-122501 |   | 5/1996 |
| JP | 09-208898 |   | 8/1997 |
| JP | 10-069865 |   | 3/1998 |
| JP | 2000-212514 | * | 8/2000 |
| JP | 2003-215306 |   | 7/2003 |

* cited by examiner

*Primary Examiner*—Marc S. Zimmer
(74) *Attorney, Agent, or Firm*—McKenna Long & Aldridge LLP

(57) ABSTRACT

The present invention relates to a coating composition for forming an anti-reflective coating layer for a display device, comprising a fluorinated silane with low surface tension, a conductive polymer with antistatic properties, water, and a solvent. Thus, the coating film of the present invention prepared by coating the composition has high anti-reflection, excellent stain resistance to liquid-phase stains such as fingerprints and the solid-phase stains such as dust by controlling the refractive index, surface energy, and conductivity, and thus can be usefully applied to the outermost side of a display device, regardless of the type of substrates such as a Braun tube or a flat display film and the presence of other coating layers such as a hard coating layer and an anti-glare coating layer.

8 Claims, No Drawings

ANTI-REFLECTIVE COATING COMPOSITION AND COATING FILM WITH EXCELLENT STAIN RESISTANCE

CROSS REFERENCE TO RELATED APPLICATION

This application claims priority to and the benefit of Korean Patent Application No. 10-2004-0025704 filed on Apr. 14, 2004, which is hereby incorporated by reference for all purposes as if fully set forth herein.

BACKGROUND OF THE INVENTION

1. Field of the Invention

The present invention relates to a coating composition for forming an anti-reflective coating layer with excellent stain resistance and anti-reflection. More specifically, the present invention provides a coating composition comprising a fluorinated silane with low surface tension, a conductive polymer with anti-static property, and a solvent.

2. Description of the Related Art

There are various display devices, including Braun tubes such as cathode ray tubes (CRTs) for monitors and color picture tubes (CPTs) for televisions; and thin film transistor-liquid crystal displays (TFT-LCDs), PDPs, RPTSs, and LCDs for cellular phones, watches, and picture display. Display devices which are exposed to natural light reflect the light, and the reflected light causes eye fatigue and headaches and lowers the contrast of the display devices by preventing images from forming clearly at an inner part of the display.

To resolve the problems, a coating layer with low reflectance has been researched. Laid-open Japanese patent publication Nos. 1997-208898 and 1996-122501 disclose a coating layer having a refractive index of 1.28–1.38 by using a silicone compound and metal fluoride such as magnesium fluoride ($MgF_2$). European patent publication No. 0 776 925 B1 provides a coating film prepared by using a fluorinated silane and a compound including a fluorinated alkyl group, which obtains a coating film with anti-reflectance and stain-resistance by decreasing surface energy.

However, the coating layer with low reflectance including a fluorinated compound is easily charged on its surface by electrification such as through friction. Thus, dust can easily attach to the layer, and is difficult to remove. In particular, because the layer with low reflectance is usually located at an outermost part of the display, it must have resistance to stains such as from fingerprints as well as from dust. Stain-resistance of the reflective layer means that the electric charge on the surface does not disappear or stop, but flows, and thus electrostatic attraction for attaching the dust to the surface does not occur.

Therefore, the prior art has disclosed methods of preventing dust from attaching to the surface without static charge. Laid-open Japanese patent publication No. 1994-65529 disclosed conductive metal fillers such as tin-doped indium oxide (ITO), antimony-doped tin oxide (ATO), and antimony-doped zinc oxide (AZO). However, the conductive metal oxides generally have a high refractive index, thus are not expected to have an anti-reflective effect or to remove liquid-phase stains such as fingerprints.

Furthermore, in laid-open Japanese patent publication No. 2003-215306, the anti-reflection layer contains a fluorine group and a functional group with a positive charge and a negative charge so as to improve the removal of solid-phase stains such as dust and liquid-phase stains such as fingerprints. However, it is susceptible to environmental change, and has difficulty in removing the liquid-phase stains.

Therefore, it is needed to provide an anti-reflective coating composition for display devices to provide anti-reflection properties and removal properties of both liquid-phase stains and dust, by controlling the refractive index, surface energy, and conductivity of the coating layer.

SUMMARY OF THE INVENTION

The object of the present invention is to provide a coating composition for forming an anti-reflective coating layer in a display device, where the coating layer has anti-reflection properties caused by a low refractive index, and stain resistance caused by low surface energy and anti-static properties, and where the coating layer is applied to the front side of the display device.

To accomplish the object, the present invention provides a coating composition for forming an anti-reflective coating layer in a display device which comprises (a) a sol-gel reaction product produced by a alkoxy silane, a fluorinated silane, a catalyst, water, and an organic solvent; and (b) a conductive polymer.

DETAILED DESCRIPTION OF THE ILLUSTRATED EMBODIMENTS

The present invention is described in more detail below.

To endeavor to develop an anti-reflective coating composition for forming a coating layer in a display device, where the coating layer has anti-reflection properties caused by a low refractive index and stain resistance caused by low surface energy and anti-static properties, and where the coating layer is applied to the front side of the display device, the present inventor completed the present invention by inventing a coating composition comprising an alkoxy silane for providing mechanical properties to a coating film, a fluorinated silane for providing a low refractive index and excellent resistance to liquid-phase stains, and a conductive polymer for providing anti-static properties on the film surface to remove solid-phase stains such as dust.

The coating composition for forming an anti-reflective coating layer in a display device according to the present invention comprises:

(a) a sol-gel reaction product produced with (i) 0.3 to 15 parts by weight of a alkoxy silane, (ii) 0.1 to 10 parts by weight of a fluorinated silane, (iii) 0.001 to 0.5 parts by weight of a catalyst, (iv) 0.01 to 10 parts by weight of water, and (v) 20 to 99.5 parts by weight of an organic solvent; and
(b) 0.02 to 50 parts by weight of a conductive polymer.

The alkoxy silane is contained in a coating composition to provide mechanical strength to a coating film, so that the film can be applied to the outermost side of the display device. Examples of the alkoxy silane are silicone compounds having four functional groups such as tetramethoxysilane and tetraethoxysilane; and silicone compounds having three functional groups such as methyltrimethoxysilane, methyltriethoxylsilane, glycidoxypropyltrimethoxysilane, glycidoxypropyltriethoxysilane, etc.

If the amount of the alkoxy silane for producing the sol-gel reaction product is less than 0.3 parts by weight, it is difficult to maintain strength of the coating layer for a display device. If the amount of the alkoxy silane exceeds 15 parts by weight, the coating layer can curl and has difficulty in adhering to the substrate surface because of the high hardness of the coating layer.

The fluorinated silane is contained for lowering the refractive index, and for easily removing liquid-phase stains. Examples are tridecafluorooctyltriethoxysilane (DYNASYLAN F8261™, Degussa-Huls), heptadecafluorodecyltrimethoxylsilane (TSL8233™, Toshiba silicon, KBM-7803™, Shinetsu), heptadecafluorodecyltriisopropoxysilane (XC95-A9715™, Toshiba silicone), etc.

If the amount of fluorinated silane is less than 0.1 parts by weight, it is not sufficient to control the refractive index of the coating layer, or the stain resistance. If the amount is more than 10 parts by weight, the strength can fall.

In addition, the fluorinated silane is preferably used in an amount of 10 to 50 wt % based on 100 wt % of the total amount of alkoxy silane and fluorinated silane. If the amount of fluorinated silane is less than 10 wt %, a sufficient refractive index and stain resistance for liquid-phase stains cannot be obtained. If the amount exceeds 50 wt %, it can be difficult to control the molecular weight suitable for sol-gel reaction, and it decreases the strength of the film.

When the organic solvent is used at less than 20 parts by weight, or more than 99.5 parts by weight, the composition cannot be easily coated on a substrate surface.

Examples of the organic solvent are one or a mixture of at least two solvents selected from the group consisting of alcohols, cellosolves, ketones, and mixtures thereof. The alcohols preferably include at least one selected from the group consisting of methanol, ethanol, propanol, and butanol, but are not limited thereto. The cellosolves preferably include at least one selected from the group consisting of methylcellosolve, ethylcellosolve, butylcellosolve, hexylcellosolve, and isopropoxycellosolve, but are not limited thereto. The ketones preferably include at least one selected from the group consisting of acetone, methylethylketone, diacetonealcohol, and methylisobutylketone.

Poor compatibility between fluorinated silane and the conductive polymer can induce phase separation in the coating composition. Thus, the coating composition preferably includes an alcohol with a low boiling point (below 100° C.) as a solvent to prevent the phase separation. More preferably, the alcohol can be mixed with at least one solvent with a middle boiling point (about 100° C. to 150° C.) such as one selected from the group consisting of ketones and cellosolves. The amount of solvent with a middle boiling point in the mixture ranges from equal to or less than 30 wt %, and more preferably 1 to 20 wt % based on the total weight of the solvent mixture. If the amount of solvent with a middle boiling point in the mixture is more than 30 wt %, phase separation between the fluorinated silane and conductive polymer can occur, and it takes an excessively long time to dry the coating solution.

The catalyst is an acid such as nitric acid, hydrochloric acid, sulfuric acid, and acetic acid, and their metal salts. Examples of the salts are a nitrate, a hydrochloride, a sulfate, or an acetate of zirconium or indium. The catalyst can be used in the amount of 0.001 to 0.5 parts by weight. If the amount of catalyst is less than 0.001 parts by weight, it is difficult to control the time of sol-gel reaction. If the amount exceeds 0.5 parts by weight, an increase of acidity of the coating solution cause corrosion.

The water is required for hydrolysis and condensation, and is used in the amount of 0.01 to 10 parts by weight. If the amount is less than 0.01 parts by weight, it is difficult to control the time of sol-gel reaction. If it exceeds 10 parts by weight, it is difficult to coat the composition.

The conductive polymer provides anti-static properties to the substrate surface so as to easily remove the solid-phase stains. Preferred conductive polymers include polythiophene resins such as polyethylenedioxythiophene resin. In particular, to improve conductivity, the polythiophene resin can be doped with glutamic acid, alkylsufonic acid, anions of polystyrene sulfonic acid, and copolymers of styrene sulfonic acid and its anions. A conductive polymer which is commercially available is polyethylenedioxythiophene-polystyrenesulfonate, such as at least one selected from the group consisting of P (Baytron P) (Bayer), PH, P HS, P HC, P ET V2, etc.

The conductive polymer is used in the amount of 0.02 parts by weight to 50 parts by weight. If the amount is less than 0.02 parts by weight, it is difficult to remove solid-phase stains such as dust. If the amount is more than 50 parts by weight, the strength of the coating film can decrease.

The coating composition according to the present invention can be prepared according to a method known to an ordinary person skilled in the art. In an embodiment of the present invention, (a) (i) 0.3 to 15 parts by weight of an alkoxy silane, (ii) 0.1 to 10 parts by weight of a fluorinated silane, (iii) 0.001 to 0.5 parts by weight of a catalyst, (iv) 0.01 to 10 parts by weight of water, and (v) 20 to 99.5 parts by weight of an organic solvent are mixed and subjected to sol-gel reaction at pH 1 to 3, at a temperature of 15 to 90□, for 0.5 to 40 hours. The sol-gel reaction is controlled to make the final reaction product have a molecular weight of 2000 to 20,000, which is advantageous for drying and hardening the coating film. Then, the conductive polymer at 0.02 to 50 parts by weight is added to the sol-gel reaction product to prepare the coating composition.

The solid content of the coating composition is preferably 0.5 to 30 wt %, and can decrease by further adding the organic solvent depending on the temperature for drying or hardening.

The present invention provides a coating film prepared with the coating composition. That is, the coating composition can be used as an anti-reflective coating agent for a display device, and can be applied to a substrate, or a hard coating layer formed on the substrate, or a high refraction layer formed on the hard coating layer and substrate. Glass, plastic plate, or film can be used as the substrate. A coating method is suitable selected depending on the kind of substrate. The hard coating layer can be a UV curable resin, or a UV curable resin with inorganic nano-sized particles dispersed therein to improve wear resistance.

The coating composition can be coated on the substrate according to the conventional coating method. After coating, the processes of drying and hardening are preferably performed at a temperature of 70 to 120° C., for 10 to 40 hours.

In general, as the refractive index of an anti-reflective layer is lowered, the beneficial properties of the anti-reflective layer are increased. In particular, an increased difference in refractive index between the anti-reflective coating layer and its lower layer increases the anti-reflection properties. The thickness of the anti-reflective layer is determined depending on the refractive index of the components and the wavelength of incident light. For example, if a hard coating layer with a refractive index of 1.51 and an anti-reflective layer with a refractive index of 1.38 are formed on the substrate, and the wavelength of incident light is 550 nm, the desired thickness of the anti-reflective layer is calculated to be 100 nm.

The anti-reflective coating layer can be applied to the outermost side of a display device, regardless of the type of substrates used, such as a Braun Tube or a flat display film, or the presence of another coating layer such as a hard coating layer and an anti-glare coating layer.

The present invention is further explained in more detail with reference to the following examples. These examples, however, should not be interpreted as limiting the scope of the present invention in any manner.

EXAMPLE 1

10 g of tetraethoxysilane, 3 g of heptadecafluorodecyltrimethoxylsilane, 3 g of water, 0.12 g of hydrochloric acid, and 58.88 g of ethanol were mixed and sol-gel reacted at pH 2, at a temperature of 78° C. for 3 hours. After the reaction product cooled to room temperature, 25 g of the conductive polymer Baytron P ET V2 was added thereto to produce an anti-reflective coating composition.

The coating composition was coated on a hard coating film by a roll coating method, and dried to a thickness of 100 nm. The coated film was hardened in an oven at 120° C. for 10 hours.

EXAMPLE 2

The anti-reflective coating film was prepared substantially according to the same method of Example 1, except that the Baytron P ET V2 as a conductive polymer was substituted with 25 g of Baytron PH.

EXAMPLE 3

The anti-reflective coating film was prepared substantially according to the same method of Example 1, except that fluorinated silane was substituted for the heptadecafluorodecyltriisopropoxysilane.

EXAMPLE 4

The anti-reflective coating film was prepared substantially according to the same method of Example 1, except that the amount of ethanol and the conductive polymer were 83.86 g and 0.02 g, respectively.

EXAMPLE 5

The anti-reflective coating film was prepared substantially according to the same method of Example 1, except that the amount of ethanol and heptadecafluorodecyltrimethoxylsilane were 60.88 g and 1 g, respectively.

EXAMPLE 6

The anti-reflective coating film was prepared substantially according to the same method of Example 1, except that the amount of ethanol and heptadecafluorodecyltrimethoxylsilane were 51.88 g, and 10 g, respectively.

EXAMPLE 7

The anti-reflective coating film was prepared substantially according to the same method of Example 1, except that the solvent was substituted with a mixture of 35.28 g of ethanol, 11.8 g of diacetonealcohol, and 11.8 g of butylcellosolve.

EXAMPLE 8

The anti-reflective coating film was prepared substantially according to the same method of Example 1, except that the solvent was substituted with a mixture of 78.1 g of ethanol, 0.39 g of diacetonealcohol, and 0.39 g of butylcellosolve.

COMPARATIVE EXAMPLE 1

The anti-reflective coating film was prepared substantially according to the same method of Example 1, except that Baytron P ET V2 as a conductive polymer was not used.

COMPARATIVE EXAMPLE 2

The anti-reflective coating film was prepared substantially according to the same method of Example 1, except that the heptadecafluorodecyltrimethoxylsilane was substituted with methyltriethoxylsilane.

COMPARATIVE EXAMPLE 3

The anti-reflective coating film was prepared substantially according to the same method of Example 1, except that the amount of ethanol and Baytron P ET V2 were 68.88 g and 15 g, respectively.

TEST EXAMPLES

For the coating film prepared by Examples 1 to 8 and Comparative Examples 1 to 3, the contact angle, removal capacity of a character written with an oil-based pen, removal of dust, and reflectance were evaluated.

1) Contact Angle of Water

The contact angle of water of the coating film was measured to determine the property to readily remove a liquid-phase stain. When the contact angle is equal to or more than 90°, the liquid-phase stain was properly removed.

2) Removal Capacity of Character Written with Oil-Based Pen

The character written with an oil-based pen was observed with the naked eye to determine the removal capacity.

3) Removal of Dust Capacity

The coating film was rubbed with a cotton cloth with width of 10 cm and a length of 10 cm 20 times, and was then sprayed with a spray powder from a distance of 30 cm, 5 times at intervals of one minute. After the powder settled on the coating film, the film was blown with air at 2 atm for 10 seconds, and then remaining powder was observed with the naked eye to classify as "high" and "low".

4) Reflectance

The back side of the coating film was treated with black, and then reflectance was measured with a spectrophotometer (N&K) to determine the anti-reflection property depending on the minimum reflectance.

TABLE 1

| | Contact angle (°) | Character removal | Dust removal | Minimum reflectance (%) | Haze (%) |
|---|---|---|---|---|---|
| Example 1 | 102 | high | high | 2.0 | 0.7 |
| Example 2 | 104 | high | high | 1.8 | 0.6 |
| Example 3 | 97 | high | high | 2.2 | 0.6 |
| Example 4 | 100 | high | low | 1.6 | 0.6 |
| Example 5 | 80 | middle | high | 2.8 | 0.7 |
| Example 6 | 104 | high | low | 1.2 | 0.8 |
| Example 7 | 104 | high | high | 1.8 | 0.4 |
| Example 8 | 103 | high | high | 2.0 | 0.6 |
| Comparative Example 1 | 104 | high | low | 1.5 | 0.3 |
| Comparative Example 2 | 70 | low | high | 3.3 | 0.7 |
| Comparative Example 3 | 99 | high | high | 2.1 | 1.0 |

In Table 1, the terms of 'high', 'middle', and 'low' in the column of character removal indicate removal properties of 'above 90%', '70% to 90%', and 'below 70%', respectively.

As shown in Table 1, the films coated with the coating compositions including the conductive polymer had excellent dust removal properties, however the films coated with the coating compositions including a sol-gel reaction product without a fluorinated silane had high surface energy, high reflectance, and low removal capacity for liquid-phase stains.

What is claimed is:

1. A coating composition for forming an anti-reflective coating layer in a display device, comprising:
   (a) a sol-gel reaction product prepared by reacting (i) an alkoxy silane at 0.3 to 15 parts by weight, (ii) a fluorinated silane at 0.1 to 10 parts by weight, (iii) a catalyst at 0.001 to 0.5 parts by weight, (iv) water at 0.01 to 10 parts by weight, and (v) an organic solvent at 20 to 99.5 parts by weight; and
   (b) a conductive polymer at 0.02 to 50 parts by weight.

2. The coating composition according to claim 1, wherein the organic solvent is a mixture comprising at least two solvents selected from the group consisting of alcohols, cellosolves, and ketones.

3. The coating composition according to claim 2, wherein the mixture comprises alcohols, and further comprises at least one selected from the group consisting of ketones and cellosolves.

4. The coating composition according to claim 1, wherein the fluorinated silane is at least one selected from the group consisting of tridecafluorooctyltriethoxysilane, heptadecafluorodecyltrimethoxylsilane, heptadecylfluorodecyltrimethoxysilane, and a mixture thereof.

5. The coating composition according to claim 1, wherein the conductive polymer is a polythiophene.

6. The coating composition according to claim 1, wherein the conductive polymer is a polythiophene doped with at least one selected from the group consisting of glutamic acid, alkylsufonic acid, anions of polystyrene sulfonic acid, a copolymer of styrene sulfonic acid and its anions, and a mixture thereof.

7. The coating composition according to claim 1, wherein the catalyst is at least one selected from the group consisting of acids, metal salts, and a mixture thereof.

8. An anti-reflective coating film for a display device prepared with the anti-reflective coating composition according to claim 1.

* * * * *